United States Patent
Kaup et al.

[11] 3,941,147
[45] Mar. 2, 1976

[54] LEVEL CONTROL FOR SURFACE TREATMENT BATHS

[75] Inventors: Friedel Kaup, Gutersloh; Heinrich Warnke, Marienfeld, both of Germany

[73] Assignee: Miele & Cie, Gutersloh, Germany

[22] Filed: Oct. 5, 1973

[21] Appl. No.: 403,779

[52] U.S. Cl. .................. 137/453; 137/577; 222/64
[51] Int. Cl.² ........................................ E03B 11/00
[58] Field of Search ........... 137/262, 263, 265, 571, 137/576, 577, 577.5, 578, 579, 614, 453; 222/64, 564

[56] References Cited
UNITED STATES PATENTS

| 1,225,416 | 5/1917 | Khotinsky | 137/577 |
|---|---|---|---|
| 1,626,782 | 5/1927 | Brooks | 137/577 |
| 1,668,793 | 5/1928 | Wiggins | 222/64 |
| 1,743,966 | 1/1930 | Goudard | 137/576 |
| 1,883,139 | 10/1932 | Walter | 222/64 |
| 2,059,716 | 11/1936 | Swinburne | 137/571 |
| 2,191,019 | 2/1940 | Johnson | 137/571 |
| 2,225,498 | 12/1940 | Hollander | 137/577 |
| 2,508,170 | 5/1950 | Kaufmann | 137/571 |
| 2,573,468 | 10/1951 | Mackin | 137/577 |
| 3,229,518 | 1/1966 | Nilsson | 137/571 |
| 3,425,928 | 2/1969 | Emery et al. | 137/579 |

*Primary Examiner*—Martin P. Schwadron
*Assistant Examiner*—George L. Walton
*Attorney, Agent, or Firm*—Fleit & Jacobson

[57] ABSTRACT

A level control device for pickling, degreasing, nickel-plating baths or the like, comprising at least two baths of different specific gravities, wherein the two baths are joined to a connecting pipe and the connecting pipe runs into the bath of lower specific gravity just below the bath level so that level control is possible without pumps or float switches or the like.

5 Claims, 7 Drawing Figures

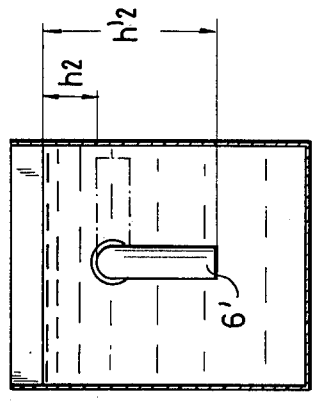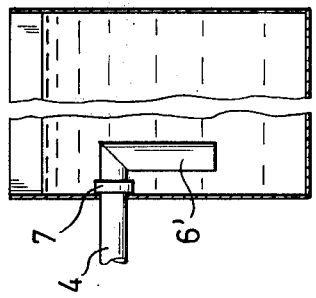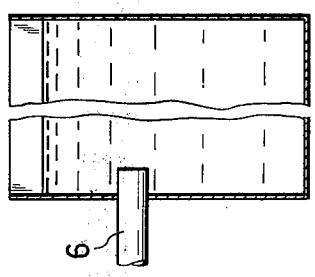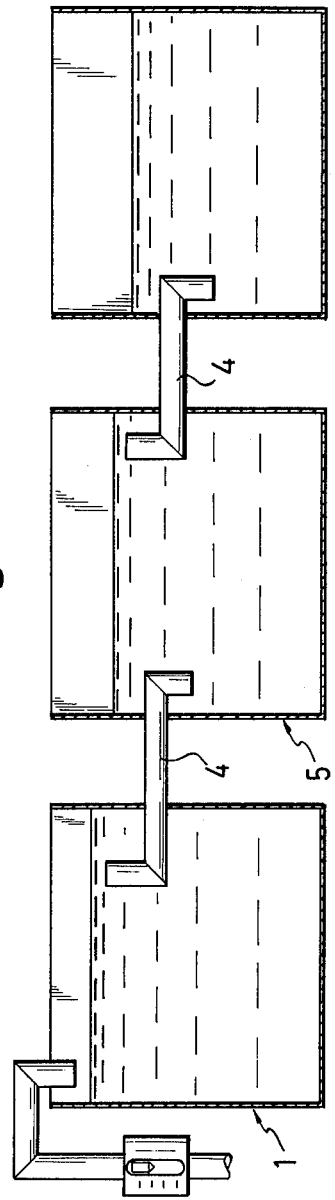

LEVEL CONTROL FOR SURFACE TREATMENT BATHS

The invention relates to a level control for pickling, degreasing, nickel-plating, chrome-plating baths or the like comprising two or more baths of different specific gravities and different bath heights.

In such baths it is customary to replace the liquid that has evaporated or been carried away by the transport of goods from the subsequent bath in the direction of the transport of goods. This affords the advantage that some of the chemicals carried off by the transport of goods are regained.

In addition, this form of level control also makes it possible to keep the liquid level in the pickling bath slightly lower than that in the rinsing bath so that salts which have formed on the carriers of the goods at the boundary phase between the liquid and air can be washed off the carriers of the goods in the rinsing bath.

In a known level control device the chemicals that have been carried off are returned by a pump.

However, a disadvantage of these known devices consists in the fact that the pumps and accompanying regulating facilities are very expensive and very prone to trouble as a result of operation in the aggressive liquids.

In another known form of level control the individual baths are joined together via hydraulic siphons.

The last rinsing bath is kept constant by a float. The level is balanced out from the float-controlled rinsing bath via the hydraulic siphons. In order that the hydraulic siphons can become effective, they have to be connected to a vacuum pipe to remove the air when they are started up.

However, a disadvantage of this known form of level control is that a vacuum pump is additionally required.

The object of the invention is to remedy these known disadvantages and to disclose a level control system wherein the level of the treatment baths connected ahead of a rinsing bath can be controlled without pumps or float switches.

To this end the invention is characterised in that the two baths are joined to a connecting pipe and the connecting pipe runs into the bath of lower specific gravity just below the bath level.

Another feature of the invention consists in the fact that the connecting pipe runs into the bath of greater specific gravity at a certain distance below the bath level and the connecting pipe is joined to an outlet union of adjustable height in the bath of greater specific gravity.

Several embodiments of the invention are illustrated diagrammatically in the drawings.

FIG. 4 shows a pickling bath with a simple outlet union;

FIG. 5 is a sectional front view of a pickling bath having a rotary outlet union;

FIG. 6 is a side view of the pickling bath according to FIG. 5; and

FIG. 7 shows an embodiment with more than two baths.

Figure 1:
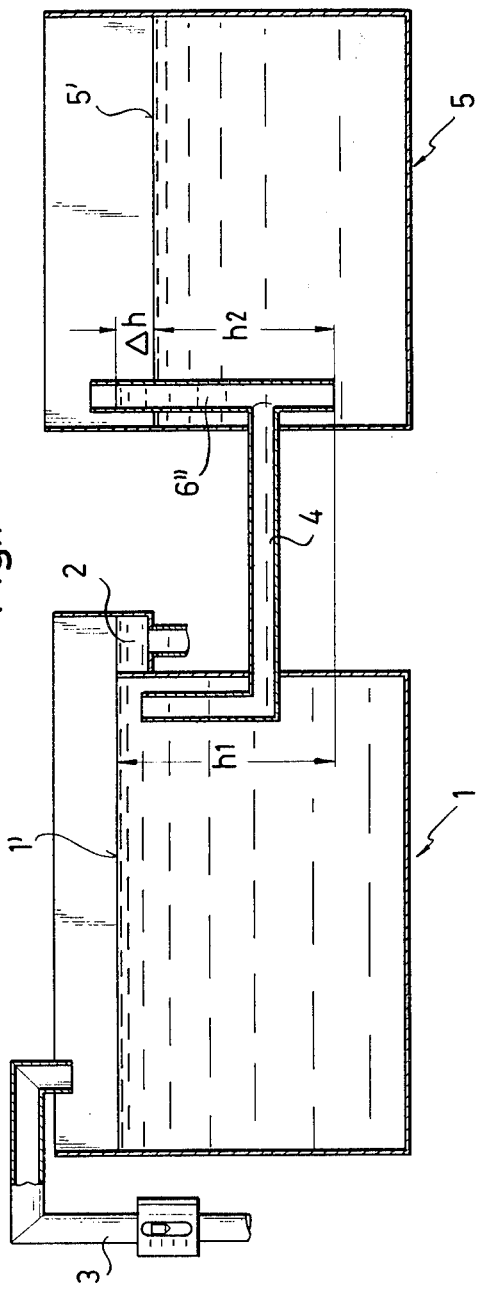
FIG. 1 is a sectional side view of a rinsing bath and pickling bath or the like with a connecting pipe.

Rinsing bath 1 has an overflow 2 and a controllable water supply 3. In addition, rinsing bath 1 is joined to a pickling bath 5 or the like via a connecting pipe 4. Connecting pipe 4 terminates in pickling bath 5 in an outlet union 6.

The following equilibrium equation is obtained for liquids of different specific gravities in rinsing bath 1 and pickling bath 5:

$$h_1 \cdot \gamma_1 = h_2 \cdot \gamma_2 \qquad (1)$$

In addition:

$$\Delta h + h_2 = h_1 \qquad (2)$$

Inserted in equation (1)

$$(\Delta h + h_2) \cdot \gamma_1 = h_2 \cdot \gamma_2 \qquad (3)$$

Reversal of equation (3)

$$\Delta h = h_2 (\gamma_2 - \gamma_1)/\gamma_1$$

The last notation of equation 3 shows clearly that the level difference $\Delta h$ is proportional to quantity $h_2$.

When outlet union 6 is joined to connecting pipe 4 via a rotary coupling 7, quantity $h_2$ may be varied infinitely within wide limits.

As level difference $\Delta h$ between the bath of greater specific gravity and the bath of lower specific gravity is proportional to quantity $h_2$, quantity $\Delta h$ can be varied by turning an angle-shaped outlet union 6'.

When a riser 6'' open at the top and bottom is used as outlet union 6, connecting pipe 4 need not rise up to rinsing bath 1 because proper air removal is then secured on all accounts.

Connecting pipe 4 may open up infront of or in overflow 2 of rinsing bath 1. This ensures that rinsing bath 1 will not become unusable in the event of backflow out of pickling bath 5. However, a backflow may only occur when too much pickling liquid is poured in when pickling bath 5 is being refilled. During the pickling process no pickling liquid can flow through connecting pipe 4 into rinsing bath 1 because pickling liquid evaporates in pickling bath 5 as a result of liquid being carried off by the transport of goods and on account of the evaporation of the pickling bath which is almost always heated. The level of the liquid in pickling bath 5 thus drops steadily during operation whereas the level of the liquid in rinsing bath 1 is always constant as a result of the controlled supply of water. So much liquid flows out of rinsing bath 1 through connecting pipe 4 to pickling bath 5 that the liquid losses in pickling bath 5 are balanced out again.

Figure 2:
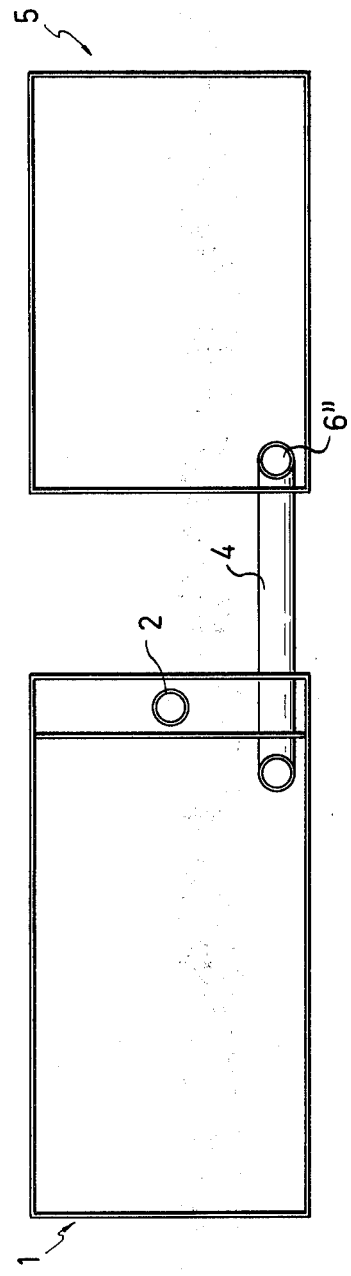
FIG. 2 is a top view of FIG. 1.
Figure 3:
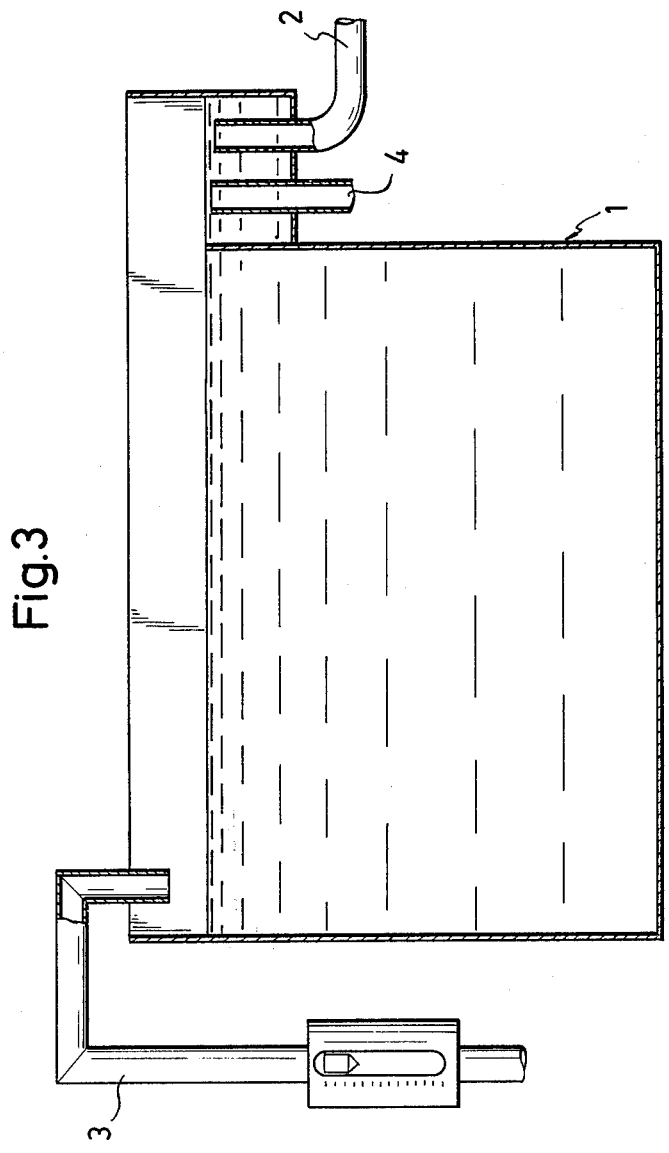
FIG. 3 shows a rinsing bath with a connecting pipe arranged in the overflow.

In the embodiment illustrated in FIGS. 1 to 3 the level of rinsing bath 1 is controlled by a proportioned water supply and overflow 2. However, the supply of water to rinsing bath 1 may also be effected via a float control system or the like.

It is also possible to control more than two baths with the level control system according to the invention. The individual baths then have to be joined together by one connecting pipe in each case. This allows the liquid losses to be replaced from the respectively subsequent bath. The losses in pickling liquid or the like caused by their being carried off are thus very slight.

Besides, the rinsing water in the last rinsing bath 1 is replenished continuously.

We claim:

1. A level control device for pickling, degreasing, nickel-plating and similar process apparatus having at least two baths of different specific weight in which the bath level of the bath with the higher specific weight is below the bath level of the bath with the lower specific weight, comprising pipe means for connecting the two baths having a first vertical portion positioned in the bath with the lower specific weight and having an upper inlet end positioned directly below the bath level of the bath with the lower specific weight, a second horizontal portion forming an angle of 90° with the first portion and being connected at one end to the lower end of the first portion, and a third portion positioned in the bath with the higher specific weight and forming an angle of 90° with the second portion, said third portion having an outlet end positioned below the inlet end of the first portion and means for adjusting the height of the outlet end of the third portion of said pipe means in the bath with the higher specific weight without movement of said first and second portion so that flow occurs from the bath of lower specific weight to the bath of higher specific weight through said pipe means.

2. The level control device of claim 1 in which said adjusting means comprises means for adjusting the difference in height between the bath level of the bath with the lower specific weight and the outlet end of said pipe means so that the height difference is equal to $\Delta h + h_2$ in which $\Delta h = h_2 (\gamma_2 - \gamma_1)/\gamma_1$; $h_2$ is the difference between the bath level of the bath with the higher specific weight and the outlet end of the pipe means; $\gamma_1$ is the specific weight of the bath with the lower specific weight; and $\gamma_2$ is the specific weight of the bath with the higher specific weight.

3. The level control device of claim 1 in which said means for adjusting the height of the outlet end of the third portion of said pipe means comprises a rotary coupling between the third and second portions of said pipe means so that the third portion can be rotated relative to the second portion.

4. The level control device of claim 1 in which the third portion of said pipe means comprises a riser in which the end opposite to the outlet end is open and extends above the bath level of the bath with the higher specific weight so that air can escape from said pipe means.

5. The level control device of claim 1 and further comprising overflow means in combination with said bath with the lower specific weight, the inlet end of the first portion of said pipe means being placed in said overflow.

* * * * *